(12) United States Patent
Kwiat et al.

(10) Patent No.: US 12,467,732 B2
(45) Date of Patent: Nov. 11, 2025

(54) PRECISION QUANTUM-INTERFERENCE-BASED NON-LOCAL CONTACTLESS MEASUREMENT

(71) Applicant: THE BOARD OF TRUSTEES OF THE UNIVERSITY OF ILLINOIS, Urbana, IL (US)

(72) Inventors: Paul G Kwiat, Savoy, IL (US); Colin P Lualdi, Weston, MA (US); Spencer Johnson, El Paso, TX (US); Kristina Meier, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 449 days.

(21) Appl. No.: 17/948,308

(22) Filed: Sep. 20, 2022

(65) Prior Publication Data

US 2025/0003730 A1 Jan. 2, 2025

Related U.S. Application Data

(60) Provisional application No. 63/249,256, filed on Sep. 28, 2021.

(51) Int. Cl.
| | |
|---|---|
| *G01B 9/02001* | (2022.01) |
| *G01H 9/00* | (2006.01) |
| *G01S 17/08* | (2006.01) |

(52) U.S. Cl.
CPC .......... *G01B 9/02007* (2013.01); *G01H 9/00* (2013.01); *G01S 17/08* (2013.01)

(58) Field of Classification Search
CPC .. G01B 9/02007; G01B 2290/70; G01H 9/00; G01S 17/08
See application file for complete search history.

(56) References Cited

U.S. PATENT DOCUMENTS

| 3,013,467 A | 12/1961 | Minsky | |
|---|---|---|---|
| 6,678,054 B1 * | 1/2004 | Dress | ........................ G02F 1/39 356/450 |

(Continued)

FOREIGN PATENT DOCUMENTS

CN 108844464 B 10/2020

OTHER PUBLICATIONS

Abouraddy, A. F., Nasr, M. B., Saleh, B. E. A., Sergienko, A. V. & Teich, M. C. Quantum-optical coherence tomography with dispersion cancellation. Phys. Rev. A 65, 053817 (2002).

(Continued)

*Primary Examiner* — Thanh Luu
*Assistant Examiner* — Mai Thi Ngoc Tran
(74) *Attorney, Agent, or Firm* — McDonnell Boehnen Hulbert & Berghoff LLP

(57) ABSTRACT

Methods and systems are provided to generate and use pairs of highly nondegenerate frequency-entangled photons for Hong-Ou-Mandel interferometric measurement of local or remote samples. The use of highly nondegenerate frequency-entangled photon pairs enables ultra-high spatial resolutions even in the presence of background noise, dispersive intermediate media and/or dispersive or multi-interface targets, and high probe photon losses. The use of highly nondegenerate, narrow-band, frequency-entangled photon pairs for interferometric measurement of distance also allows the interferometer to be calibrated more easily for the two (or more) discrete narrow bands of wavelengths represented by the photon pairs. The use of narrow-band nondegenerate frequency-entangled photon pairs also permits improved noise rejection and increased fidelity in coincidence detection.

20 Claims, 7 Drawing Sheets

(56) References Cited

U.S. PATENT DOCUMENTS

| | | |
|---|---|---|
| 6,762,844 B2 | 7/2004 | Dress et al. |
| 6,882,431 B2 | 4/2005 | Teich et al. |
| 2013/0143744 A1* | 6/2013 | Marsili ............... H10N 60/84 716/122 |
| 2022/0026195 A1* | 1/2022 | Fertig ............... H04B 10/29 |

OTHER PUBLICATIONS

Nasr, M. B., Saleh, B. E. A., Sergienko, A. V. & Teich, M. C. Demonstration of Dispersion-Canceled Quantum-Optical Coherence Tomography. Phys. Rev. Lett. 91, 083601 (2003).
Nasr, M. B. et al. Submicron axial resolution in an ultrabroadband two-photon interferometer using superconducting single-photon detectors. Opt. Express, OE 16, 15104-15108 (2008).
Nasr, M. B. et al. Ultrabroadband Biphotons Generated via Chirped Quasi-Phase-Matched Optical Parametric Down-Conversion. Phys. Rev. Lett. 100, 183601 (2008).
Nasr, M. B. et al. Quantum optical coherence tomography of a biological sample. Optics Communications 282, 1154-1159 (2009).
Huang, D. et al. Optical coherence tomography. Science 254, 1178-1181 (1991).
Non-Contact Profilometer | KEYENCE America: https://www.keyence.com/landing/lpc/non-contact-profilometer2.jsp?aw=bing-kaenVR293101ee&k_clickid=d0cb5ea5-e700-45a3-a1f8-8f62cc85f5ed&msclkid=7d53b2472c111161eae5edfcdb1f9206.
Krafczyk, "Investigations of Quantum Sensing Techniques For Deflection And Displacement Metrology", 2019.
Wikipedia, definition of Lidar.
Bedington et al., "Progress in satellite quantum key distribution", NPJ, Quantum Information, 2017.
Wikipedia, definition of Laser microphone.
Abe Davis et al., "The Visual Microphone: Passive Recovery of Sound from Video", Sig Graph 2014.
Ashley Lyons et. al., "Attosecond-resolution Hong-Ou-Mandel interferometry," Science Advances 2018 https://advances.sciencemag.org/content/4/5/eaap9416.
Chen, Y., Fink, M., Steinlechner, F., Torres, J. P. & Ursin, R. Hong-Ou-Mandel interferometry on a biphoton beat note. hpj Quantum Inf 5, 1-6 (2019).
Hitzenberger, C. K., Baumgartner, A., Drexler, W. & Fercher, A. F. Dispersion effects in partial coherence interferometry: implications for intraocular ranging. JBO 4, 144-151 (1999).
K. A. Meier, F. Kaneda & P. G. Kwiat, "Towards nondegenerate polarization entanglement from a waveguide downconversion source." in Advanced Photon Counting Techniques XII vol. 10659 106590K (International Society for Optics and Photonics, 2018).
Resolution (e-echocardiography.com): https://e-echocardiography.com/page/page.php?UID=1429454191#:~:text=The%20typical%20required%20resolution%20for%20medical%20ultrasound%20is,points%20along%20or%20parallel%20to%20the%20beam%27s%20path.
NSF, "Incorporated Research Institutions for Seismology".
C. K. Hong, Z. Y. Ou & L. Mandel, "Measurement of subpicosecond time intervals between two photons by interference." Phys. Rev. Lett. 59, 2044-2046 (1987).
A. Nomerotski, M. Keach, P. Stankus, P. Svihra & S. Vintskevich, "Counting of Hong-Ou-Mandel Bunched Optical Photons Using a Fast Pixel Camera." Sensors 20, 3475 (2020).
A. M. Steinberg, P. G. Kwiat & R. Y. Chiao, "Dispersion cancellation and high-resolution time measurements in a fourth-order optical interferometer." Phys. Rev. A 45, 6659-6665 (1992).
M. B. Nasr, B. E. A. Saleh, A. V. Sergienko & M. C. Teich, "Dispersion-cancelled and dispersion-sensitive quantum optical coherence tomography." Opt. Express, OE 12, 1353-1362 (2004).
F. Kaneda, K. Garay-Palmett, A. B. U'Ren & P. G. Kwiat, "Heralded single-photon source utilizing highly nondegenerate, spectrally factorable spontaneous parametric downconversion." Optics Express 24, 10733 (2016).
J. C. Chapman, T. M. Graham, C. K. Zeitler, H. J. Bernstein & P. G. Kwiat, "Time-Bin and Polarization Superdense Teleportation for Space Applications." Phys. Rev. Applied 14, 014044 (2020).
S. Ramelow, L. Ratschbacher, A. Fedrizzi, N. K. Langford, and A. Zeilinger, Discrete Tunable Color Entanglement, Phys. Rev. Lett. 103, 253601 (2009).

* cited by examiner

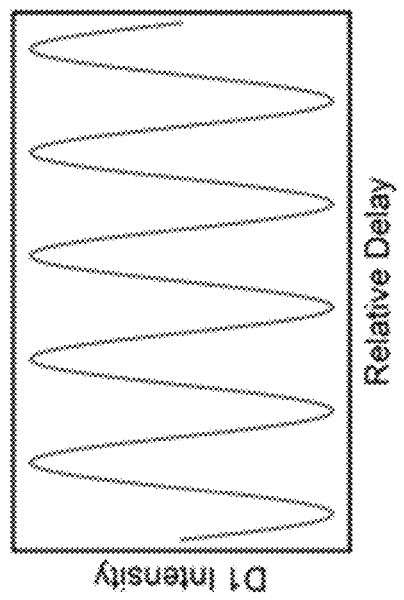
FIG. 1B
FIG. 1A
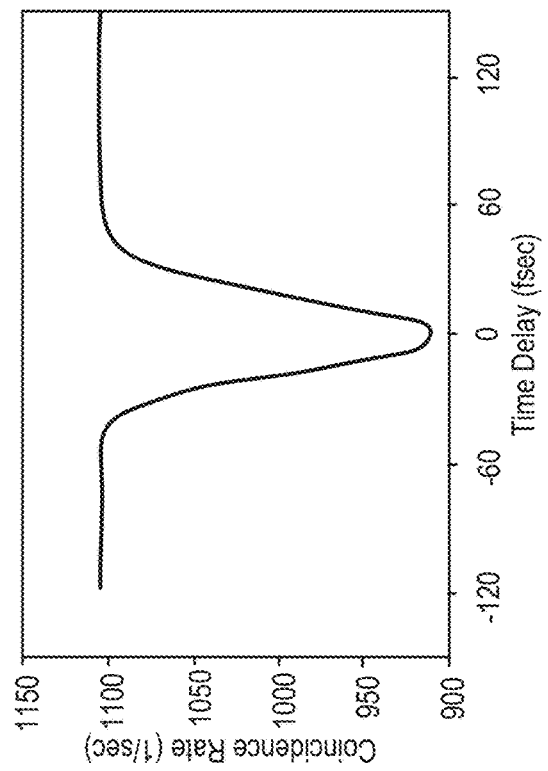
FIG. 2B
FIG. 2A

1100

OPERATE A PHOTON SOURCE TO GENERATE A PLURALITY OF PAIRS OF PHOTONS THAT ARE FREQUENCY-ENTANGLED ACROSS FIRST AND SECOND WAVELENGTHS, WHEREIN AN INTERFEROMETER IS COUPLED TO THE PHOTON SOURCE SUCH THAT A FIRST PHOTON FROM A PHOTON PAIR GENERATED BY THE PHOTON SOURCE IS DIRECTED ALONG A REFERENCE LEG OF THE INTERFEROMETER AND A SECOND PHOTON FROM THE PHOTON PAIR GENERATED BY THE PHOTON SOURCE IS DIRECTED ALONG A SAMPLE LEG OF THE INTERFEROMETER SUCH THAT THE FIRST PHOTON AND SECOND PHOTON ARE DIRECTED INTO AN INPUT OF A BEAMSPLITTER OF THE INTERFEROMETER

—1110

OPERATE A FIRST PHOTODETECTOR, A SECOND PHOTODETECTOR, A THIRD PHOTODETECTOR, AND A FOURTH PHOTODETECTOR TO DETECT A FIRST COINCIDENCE RATE AT WHICH THE PAIRS OF PHOTONS ARE COINCIDENTALLY DETECTED BY AT LEAST ONE PAIR OF THE FIRST, SECOND, THIRD, AND FOURTH PHOTODETECTORS, WHEREIN THE FIRST AND SECOND PHOTODETECTORS ARE CONFIGURED TO DETECT PHOTONS AT THE FIRST WAVELENGTH, WHEREIN THE THIRD AND FOURTH PHOTODETECTORS ARE CONFIGURED TO DETECT PHOTONS AT THE SECOND WAVELENGTH, AND WHEREIN THE FIRST AND SECOND PHOTODETECTORS ARE CONFIGURED TO RECEIVE PHOTONS EMITTED FROM RESPECTIVE FIRST AND SECOND OUTPUTS OF THE BEAMSPLITTER

—1120

BASED ON THE FIRST COINCIDENCE RATE, DETERMINE AT LEAST ONE OF A TIME DIFFERENCE BETWEEN THE REFERENCE LEG AND THE SAMPLE LEG OR LENGTH DIFFERENCE BETWEEN THE REFERENCE LEG AND THE SAMPLE LEG

PRECISION QUANTUM-INTERFERENCE-BASED NON-LOCAL CONTACTLESS MEASUREMENT

CROSS-REFERENCE TO RELATED APPLICATION

This application claims priority to U.S. Provisional Patent Application No. 63/249,256, filed Sep. 28, 2021, the contents of which are incorporated by reference.

STATEMENT REGARDING FEDERALLY SPONSORED RESEARCH OR DEVELOPMENT

This invention was made with government support under FA9550-21-1-0059 awarded by the US Air Force. The government has certain rights in the invention.

BACKGROUND

Optical interferometry is a technique that may be used for performing precision measurements. Optical interferometry utilizes beams of light and corresponding factors such as length, surface irregularities, and indices of refraction to make these measurements. Applications of optical interferometry are broad and include optical coherence tomography, high accuracy inertial navigational systems, long-baseline astronomy, and gravitational-wave detection.

Within these applications, classical interference is frequently utilized. Classical interference involves an electromagnetic wave that travels in a superposition of two optical paths and interferes with itself at a 50:50 beam splitter (BS). The differences in the length of either path results in sinusoidal interference fringes at the interferometer output from which phase and related information can be determined. Such information can then be applied to generate high-precision measurements of distance and time. Drawbacks of classical interference include sensitivity to background noise, susceptibility to path loss (e.g., to imbalanced path loss between the legs of an interferometer), and a reduction in fringe visibility when using dispersive media.

SUMMARY

In a first aspect, a system is provided that includes: (i) a photon source configured to generate pairs of photons that are frequency-entangled across first and second wavelengths; (ii) an interferometer coupled to the photon source such that a first photon from a photon pair generated by the photon source is directed along a reference leg of the interferometer and a second photon from the photon pair generated by the photon source is directed along a sample leg of the interferometer such that the first photon and second photon are directed into an input of a beamsplitter of the interferometer; (iii) a first photodetector, a second photodetector, a third photodetector, and a fourth photodetector, wherein the first and second photodetectors are configured to detect photons at the first wavelength, wherein the third and fourth photodetectors are configured to detect photons at the second wavelength, and wherein the first and second photodetectors are configured to receive photons emitted from respective first and second outputs of the beamsplitter; and (iv) a leg actuator, wherein the leg actuator is operable to adjust an effective path length of one of the reference leg or the sample leg of the interferometer.

In a second aspect, a method is provided that includes: (i) operating a photon source to generate a plurality of pairs of photons that are frequency-entangled across first and second wavelengths, wherein an interferometer is coupled to the photon source such that a first photon from a photon pair generated by the photon source is directed along a reference leg of the interferometer and a second photon from the photon pair generated by the photon source is directed along a sample leg of the interferometer such that the first photon and second photon are directed into an input of a beamsplitter of the interferometer; (ii) operating a first photodetector, a second photodetector, a third photodetector, and a fourth photodetector to detect a first coincidence rate at which the pairs of photons are coincidentally detected by at least one pair of the first, second, third, and fourth photodetectors, wherein the first and second photodetectors are configured to detect photons at the first wavelength, wherein the third and fourth photodetectors are configured to detect photons at the second wavelength, and wherein the first and second photodetectors are configured to receive photons emitted from respective first and second outputs of the beamsplitter; and (iii) based on the first coincidence rate, determining at least one of a travel time difference between the reference leg and the sample leg or length difference between the reference leg and the sample leg.

In a third aspect, a non-transitory computer-readable medium is provided having stored thereon program instructions that, upon execution by a computing device, cause the computing device to perform the method of the second aspect.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 1A illustrates aspects of an example system.
FIG. 1B illustrates properties of an output generated by the example system of FIG. 1A.
FIG. 2A illustrates aspects of an example system.
FIG. 2B illustrates experimentally measured outputs generated by the example system of FIG. 2A.
FIG. 11 illustrates a flowchart of an example method.

DETAILED DESCRIPTION

Figure 4:
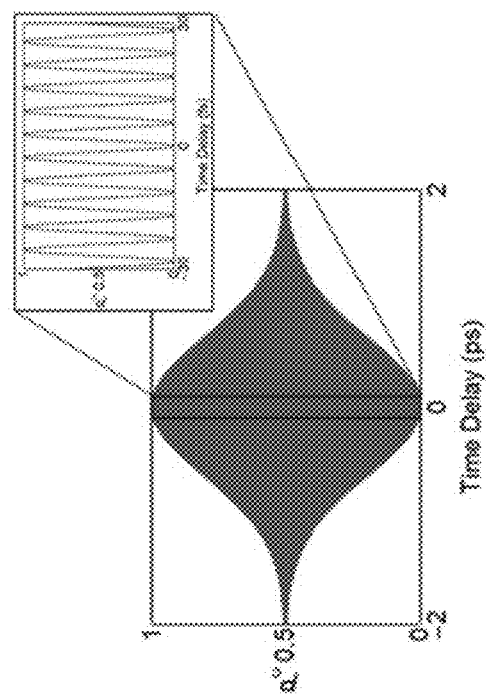
FIG. 4 illustrates properties of an output generated by the example system of FIG. 3.

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. OVERVIEW

One possible way to address the drawbacks of classical interference when applied to distance measurement or to other applications (e.g., time measurements) is to use Hong-Ou-Mandel interference (HOMi), or two-photon quantum interference. HOMi involves two photons, one traveling along each path, which are combined on a 50:50 beam splitter, rather than a single photon or coherent state (as used in classical interference). Indistinguishable pairs of photons will 'bunch up' upon interfering and exit together to either of the beam splitter's two output modes. By placing detectors at each of these modes and measuring relative time of arrival, one can observe a dip in the coincidence probability when the photons arrive simultaneously. HOMi results in increased resilience to background noise, reduced susceptibility to path loss, increased phase independence, and immunity to odd orders of group velocity dispersion, and therefore improved upon many of the limitations of classical interference for time-of-flight metrology. The resolution of HOMi measurements can be related to the width of the HOM 'dip' in the coincidence probability, which is inversely related to the photons' bandwidth. Thus, to measure increasingly small differences, larger bandwidth photons are desired. Limitations of prior implementations of HOMi include the need for extremely large bandwidth photons in order to achieve high resolution, and limits on information gained per photon (related, e.g., to resolving the shape of the coincidence probability dip).

The resolution performance of Hong-Ou-Mandel interferometry may be improved by introducing frequency entanglement between the two interfering photons. Frequency entangled HOM interference has been successfully demonstrated to result in a resolution of about 640 attoseconds/190 nm. However, this result was limited by the maximum detuning, or maximum separation in wavelength that could be achieved when using large-bandwidth photons or other varieties of interfering photons.

Embodiments of the present disclosure include an interferometer capable of performing quantum interference of frequency-entangled photons that may be used to perform spatial measurements on the nanometer scale or smaller while possessing unparalleled robustness against optical background noise, optical dispersive effects, and optical losses. Such a device has a multitude of applications that include but are not limited to: remote and contactless detection of vibrations such as those originating from machinery or sound waves, non-invasive high-resolution probing of delicate materials (e.g., biological tissues), and stealth measurements that can be made without the knowledge of third parties and that are secure against spoofing attacks.

Certain embodiments of an interferometer as described herein involve converting highly nondegenerate polarization-entangled photon pairs into frequency-entangled pairs (or generating highly nondegenerate frequency-entangled photon pairs via some other mechanism). Each member of such a photon pair then travels along a respective optical path (of potentially varying length) of an interferometer, and subsequently interfere on a beamsplitter. Due to the entangled and bosonic nature of the photons in such a pair, the resulting interference appears as a beating pattern that reveals relative differences in the length of the optical paths taken by each member of the photon pair. Such a system is sensitive to relative differences on the order of nanometers or smaller, which corresponds to travel time differences on the order of attoseconds or less. Additionally, this type of quantum interference (known as Hong-Ou-Mandel interference) has several highly desirable properties not shared with other forms of optical interference, such as robustness against optical background noise, optical dispersive effects, and optical losses.

Since there are countless mechanisms that can introduce minute changes in relative path length, ranging from mechanical vibrations to non-uniform surface topography of materials like biological tissues, certain embodiments of the present disclosure can be utilized to perform measurements on such systems with a resolution comparable to or surpassing other existing measurement and interferometry techniques, and in environments where existing technologies are unable to obtain reliable measurements due to factors such as unwanted noise, loss, incompatible materials, and stealth considerations.

Figure 8:
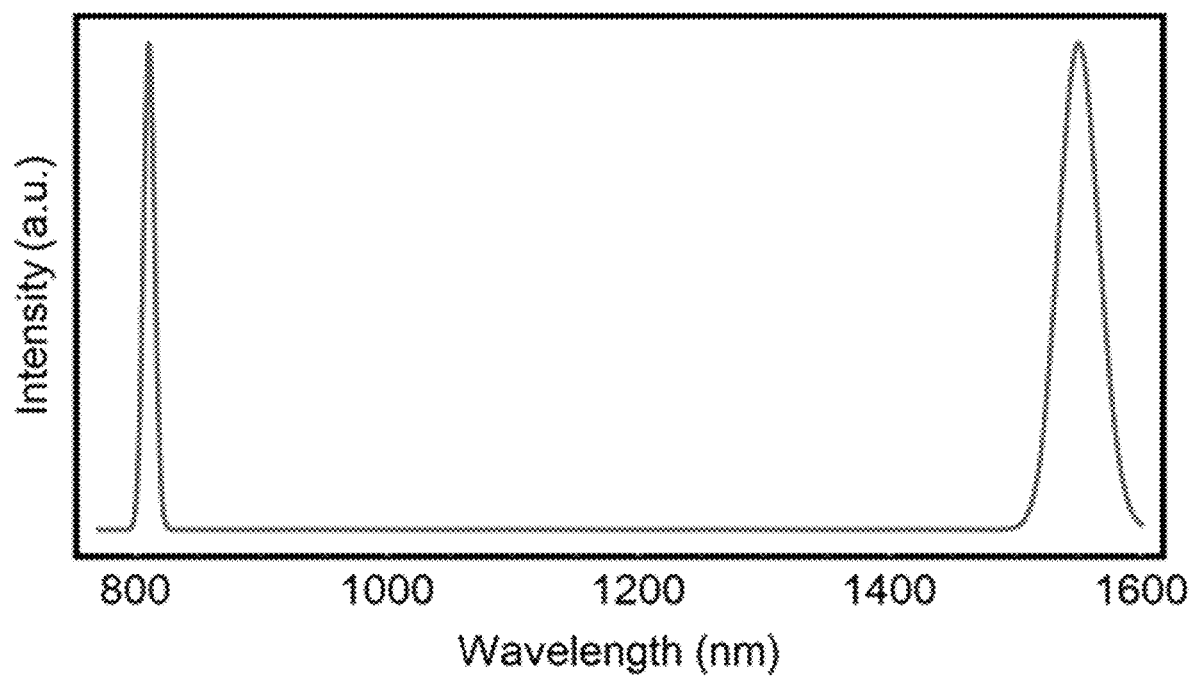
FIG. 8 illustrates properties of a signal received by an example system as described herein.

Optical interference techniques are of great value for precision measurements. Embodiments of the present disclosure include a significant advance in the attainable temporal resolution of two-photon quantum interference, by employing highly non-degenerate frequency-entangled photons, e.g., pairs of photons that are frequency-entangled across two distinct, widely spaced, and relatively narrow-band bands of frequencies/wavelengths. For example, pairs of highly nondegenerate frequency-entangled photons that are entangled between a first range of frequencies/wavelengths at approximately 810 nm (e.g., between 790 and 860 nm) and a second range of frequencies/wavelengths at approximately 1550 nm (e.g., between 1500 and 1600 nm). The spectrum of such photon pairs is illustrated by way of example in FIG. 8. Such photon pairs can be generated in a variety of ways. For example, a pair of high-fidelity non-degenerate (e.g., at two narrow bands at approximately 810 nm and approximately 1550 nm) polarization-entangled photons (generated, e.g., by spontaneous parametric down-conversion) can be converted into frequency-entangled photon pairs (e.g., using a polarizing beamsplitter (PBS) and a half wave plate (HWP)). Photons belonging to the generated entangled states can then be combined on a beamsplitter to induce interference.

By carefully controlling the photons' relative times-of-arrival via minute changes in their individual optical path lengths, the path length of the 'sample" photon can be interferometrically determined based on variations in the coincidence rate detected from the interference between the photon pairs. The embodiments described herein are able to achieve large detuning levels between the photons of each photon pair (greater than 150 THz, e.g., 177 THz, exceeding previous work by a factor of 33), leading to attosecond measurement resolution with only 10+photons, representing an improvement of two orders of magnitude over results previously reported in the literature. The use of relatively narrowband photon pairs, that are frequency-entangled between two (or more) highly non-degenerate (and thus widely separated) narrow bands of frequencies, facilitates such significant increases in the detuning level, leading to increased temporal/spatial resolution. Further, the use of such highly non-degenerate but still narrow-band photon pairs facilitates calibration of the interferometer (e.g., relative to pairs of broadband photons), as synchronizing the lengths of the two interferometer arms is more forgiving when using narrow-band photons compared to broadband photons because of the longer temporal profiles of the narrow-band photons. Furthermore, since non-degenerate narrow-band photons occupy two discrete narrow ranges of wavelengths, generation of such highly non-degenerate but still narrow-band photon pairs facilitates the design of photon sources for such photon pairs, in addition to reducing the constraints on the rest of the optical components, e.g., mirrors and beamsplitters.

The temporal resolution of systems as described herein can be verified by detecting movements and structures on attosecond (nanometer) and smaller scales, using a variety of precision actuated surfaces and nanofabricated materials. Such systems also demonstrate improvements over standard "classical" interferometers for precision measurements when directly probing dispersive and/or lossy elements (e.g., a dielectric sample coated with a thin metallic film), and in the presence of background optical noise.

Possible applications of the embodiments described herein include, but are not limited to, conducting short- or long-distance differential ranging in lossy dispersive environments with low photon fluxes, making 'stealth' measurements, probing the topography of highly dispersive or lossy thin films, and performing non-invasive, high-resolution imaging of delicate tissues via quantum optical coherence tomography.

Optical interferometry is a versatile technique for performing precision measurements. It boasts a diverse set of sensing applications ranging from optical coherence tomography to high-accuracy inertial navigational systems, from long-baseline-astronomy to gravitational-wave detection. Many of these applications have utilized "classical" interference, in which an electromagnetic wave (or a single photon when considered at the quantum level) travels in a superposition of two optical paths and interferes with itself at a 50:50 beamsplitter. Aspects of such an interferometer are illustrated by way of example in FIG. 1A. Small differences in the effective length of either path result in a relative phase that manifests itself as sinusoidal interference fringes at the interferometer output (illustrated by way of example in FIG. 1B), from which one can deduce phase and related information (e.g., path and time delays). Since optical fields possess sub-micron wavelengths, such optical interference is useful for high-precision measurements of distance and time.

However, classical interference suffers from several drawbacks that limit its utility and sensitivity. For example, the phase sensitivity of the interferometer is degraded when dispersive media is introduced to one of the interferometer's paths. Since photon wavepackets have a finite bandwidth, the wavelength-dependent refractive index of the dispersive media will cause the relative phase acquired by each frequency component to vary, thereby reducing the phase resolution related to a 'washing out' of the interference fringes. A similar reduction in fringe visibility can occur when the interferometer experiences relative phase fluctuations or imbalanced loss in one path compared to the other; addressing these can include active optical loss management and phase stabilization for maximum sensing performance.

These effects can be partially addressed by using two-photon quantum interference, or Hong-Ou-Mandel (HOM) interference. Rather than a classical wave or single photon in a superposition of two paths, HOM interference involves two photons, one in each path, which then are combined on a 50:50 beamsplitter. Due to their bosonic nature, indistinguishable pairs of photons will "bunch" upon interfering and exit together in only one of the beamsplitter's two output modes. Aspects of such a system are illustrated by way of example in FIG. 2A. This arises from a destructive interference between the two processes which lead to a single photon in each output port of the beamsplitter (i.e., both photons being transmitted or both photons being reflected). By placing a detector in each of these output modes and scanning through the photons' relative time-of-arrival at the beamsplitter (e.g., by scanning a piezo element or other actuator configured to adjust the relative path length of one of the legs of the interferometer), a dip in the coincidence probability is observed when the photons arrive simultaneously. The detected coincidence rate as the result of such a 'scan,' including such a 'dip,' are illustrated by way of example in FIG. 2B. Unlike classical interference, HOM interference has the advantages of phase independence, immunity to odd orders of group velocity dispersion, and robustness against imbalanced loss. The interference is also inherently more robust against background noise, since only noise counts (from background or detector dark counts) that come with a narrow coincidence window (<1 ns) need to be counted.

The resolution of HOM interference measurements is related to the width of the HOM dip (i.e., the dip in the rate of coincidence rate at the detector as a function of relative path length difference, with the 'dip' centered at the 'true' point at which the path lengths are equal), which is inversely related to the photons' bandwidth. Consequently, one can perform HOM interference with ever-larger-bandwidth photons to measure increasingly small differences in relative time-of-arrival, a useful tool for various sensing applications. Accordingly, progress has been made in HOM-based sensing, with accomplishments including implementing quantum optical coherence tomography (QOCT) and achieving few-attosecond (nanometer path length) resolution via statistical estimation theory.

Further improvements in attainable HOM resolution for a given number of detected photons is challenging due to the non-triviality of generating (and propagating through an interferometer or other instrument) ultra-broadband photons. To overcome these limitations, embodiments described herein increase HOM interferometric resolution by using photon pairs that are frequency entangled and that represent frequencies that are detuned from each other by a significant amount (e.g., more than 150 THz). For example, if the photons are in the state $$\frac{1}{\sqrt{2}}(|\omega_1\rangle_a|\omega_2\rangle_b + |\omega_2\rangle_a|\omega_1\rangle_b), \quad (1)$$

where a and b refer to the two input modes to the beamsplitter, the probability of a coincidence between detectors in the beamsplitter output ports is given by $$P_c = \frac{1}{2}\left(1 - \cos((\omega_1 - \omega_2)\tau)e^{-2\sigma^2\tau^2}\right). \quad (2)$$

Here $\tau$ is the relative delay between the photons and $\sigma$ is the half bandwidth of the individual frequency terms $\omega_1$ and $\omega_2$. Note that while the resolution in conventional HOM interference using wideband photons is limited by the photons' bandwidth, for the embodiments described herein the resolution dependence is dominated by the detuning between the two frequency modes. This approach retains the primary advantages of HOM—resilience to dispersion, imbalanced loss and background noise—with the precision of classical interferometry. Previous implementations using wideband photons were able to demonstrate a detuning of only 5.3 THz (corresponding to 12 nm), resulting in a limited resolution of only 640 attoseconds (190 nm) over $10^4$ trials.

Some embodiments of the present disclosure include creating photon pairs that are frequency entangled and that represent frequencies that are detuned from each other by a significant amount by first creating photons in the state $$\frac{1}{\sqrt{2}}(|H\rangle_{810}|V\rangle_{1590} + |V\rangle_{810}|H\rangle_{1550}), \quad (3)$$

a nondegenerate polarization-entangled state with, e.g., wavelengths 810 nm ($2\pi$*370 THz) and 1550 nm ($2\pi$*193.4 THz). Such polarization-entangled photon pairs can be generated using spontaneous parametric down-conversion or some other method. A polarizing beamsplitter, along with a halfwave plate, can then be used to transform this into the state (1) with a detuning of $2\pi$*177 THz. This frequency-entangled state acts as the input to the HOM interferometers described herein.

Upon interference of the two photons on a 50:50 beamsplitter (FIG. 3), the wavelengths are separated (e.g., using a dichroic mirror (DM) and detected using single-photon detectors (e.g., superconducting nanowire single-photon detectors) or some other photodetectors capable of single-photon sensitivity and high (e.g., nanosecond) temporal resolution with respect to coincidence detection between pairs of the photodetectors. Such photodetectors may be individually optimized for the particular two (or more) narrow bands of wavelengths represented by the photon pairs, e.g., for 810 nm and 1550 nm. Such separation according to wavelength as a part of the detection process does not substantially affect the distinguishability of such photons, and so allows for direct measurement of bunching and anti-bunching effects without compromising interferometer visibility. With such a system a time resolution below 10 attoseconds (nanometer-scale path difference) is achievable based on $10^4$ or fewer interrogating photon pairs, representing an improvement of ~2 orders of magnitude relative to prior methods. FIG. 4 shows the expected fringes in interferometer output with varying τ. As shown in FIG. 4, the width of the overall envelope of the coincidence probability as a function of time delay is inversely related to the width of each spectral peak of the photons (e.g., the width of the 810 nm and 1550 nm spectral peaks), while the width of the individual fringes (as shown in the inset of FIG. 4) are inversely related to the detuning (or frequency difference) between the spectral peaks (e.g., to the 177 THz detuning between the 810 nm and 1550 nm contents). Thus, usable resolution of a system as described herein is dominated by the width of the fringes within the overall envelope, and so the usable resolution can be increased by increasing the detuning (or frequency difference) between the two different wavelengths of light represented in the frequency-entangled photon pairs.

In order to simultaneously support both 810 nm and 1550 nm light within the apparatus (or some other pair of widely separated wavelengths), free-space components can be utilized instead of fibers. Additionally, specialized optics compatible with both wavelengths can be used to accommodate both wavelengths. Note that this is generally much easier than creating an optic that is compatible with the entire spectrum between the two wavelengths, as would be required if using ultrabroadband width photons in a standard HOM measurement.

Because the resolution dependence is dominated by the frequency detuning rather than the photons' bandwidth, as the detuning increases, the number of fringes observed also increases, improving overall resolution while bypassing an issue usually present in HOM interferometry of needing to use large bandwidth photons. With the 177 THz detuning offered by the non-degenerate spontaneous parametric downconversion source, a time resolution of below 10 attoseconds is expected for the same number of photon pairs. This represents an improvement of 2 orders of magnitude over the state of the art in HOM-based temporal resolution Note that for some applications it might be desirable to separate the wavelengths earlier (e.g., before the recombining beamsplitter) and to combine paths with the same wavelength each on their own beamsplitter (e.g., to enable optimization of the beamsplitter and other optical components for the individual wavelengths, rather than for two or more wavelengths in common). Two-photon fringes will still be observed in such a setup, though the fringes will be at the wavelength of whichever photon is experiencing the relative path delay. In such an example, the visibility of the fringes will still be immune to any loss that occurs before the wavelengths are separated.

In accordance with embodiments of the present disclosure, methods to introduce the small differential path changes in order to perform a measurement include: (a) path change using capacitively-monitored piezoelectric driven translation stage (on the 'trombone' arm in the example setup illustrated in FIG. 3), (b) a tilted dielectric slab; changing the angle of incidence through, e.g., a 1-mm glass plate by 1.1° changes the path length by approximately 1 nm, (c) a nanofabricated dielectric element (a variety of nanofabricated structure (NFS)); a fabricated structure with step heights on the order of nanometers allows for well-characterized control of path difference by controlling the location of the structure within an interferometer so as to control which portion of the structure, and thus how thick an amount of the structure, one leg of the interferometer will be subjected to, and/or (d) a nanofabricated metal-film element (another variety of NFS) similar in structure to (c); because transmission decays exponentially through a metal, this will facilitate the demonstration of an advantage of the quantum-enhanced approach described herein to the precision measurement of lossy systems.

Figure 3:
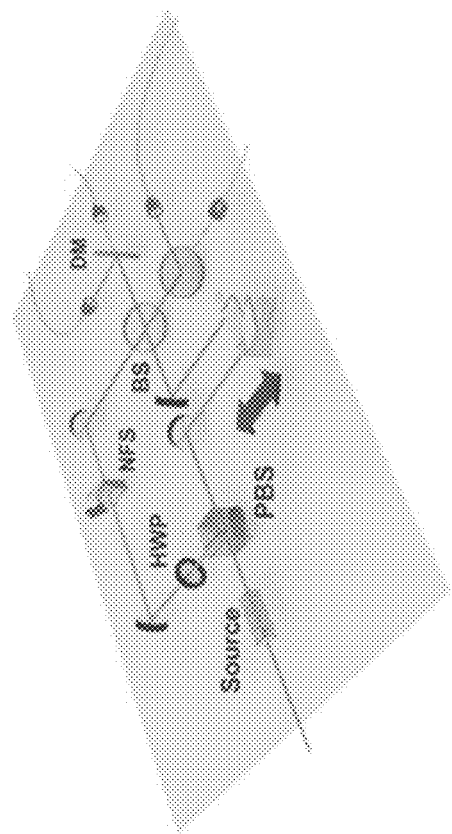
FIG. 3 illustrates aspects of an example system.
Figure 6:
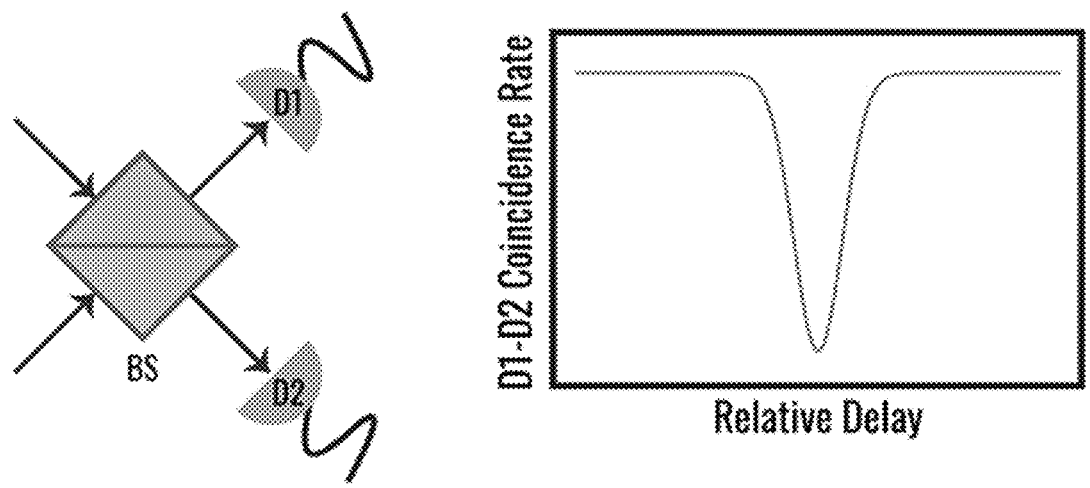
FIG. 6 illustrates aspects of an example system and properties of an output generated by the example system.
Figure 7:
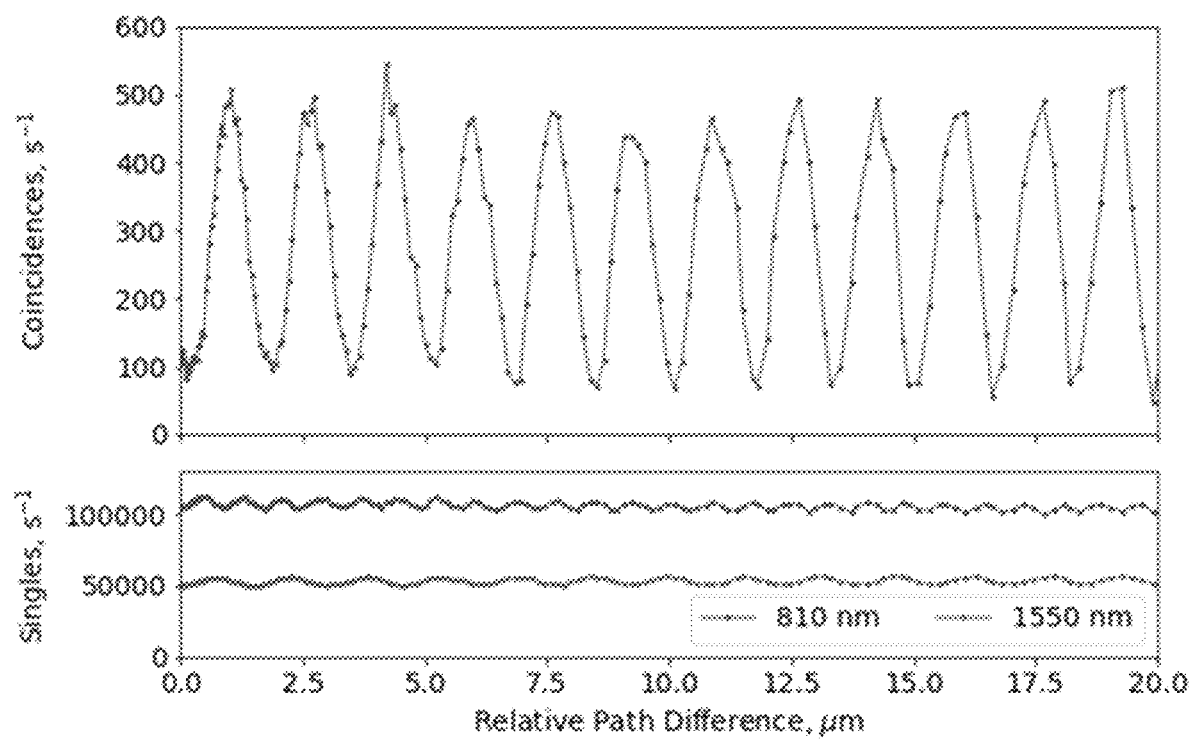
FIG. 7 illustrates experimentally measured outputs generated by an example system as described herein.

The hundred-fold improvement in resolution offered by the interferometric systems and methods described herein will enable sensing on the attosecond (nanometer) scale via HOM interference without the need for ultra-broadband sources and without the need to construct interferometers and other instruments capable of broadband operation—the individual frequencies $\omega_1$ and $\omega_2$ have bandwidths below $2\pi$*1 THz, reducing dispersion effects and simplifying interferometer calibration by virtue of much wider HOM dips. Such a method also leads to increased information efficiency (e.g., related to the ability to directly measure coincident vs. noise/single photons by virtue of being able to perform wavelength-specific photon detection), achieving higher resolution with fewer photons (a measurement scheme as described herein can saturate the "Cramér-Rao" bound and is therefore optimal or nearly optimal). FIG. 6 illustrates aspects of an example non-frequency-entangled system for performing such measurements and an illustration of the detected coincidence rate across a range of relative delays (e.g., relating to relative changes in path length), with 'simultaneous' arrival (and thus identical path lengths) illustrated by the HOM 'dip' in the coincidence rate. FIGS. 3 and 4 illustrate aspects of an example frequency-entangled system for performing such measurements. Independent detection of photons at both wavelengths received via each of the outputs of the beamsplitter (BS) are illustrated by FIG. 7, which depicts example detection rates over a range of relative path differences for coincidences (top) and singles at each of the detected wavelengths (810 nm and 1550 nm, bottom), thus confirming that an example system as in FIG. 3 performs as described elsewhere herein.

Figure 5:
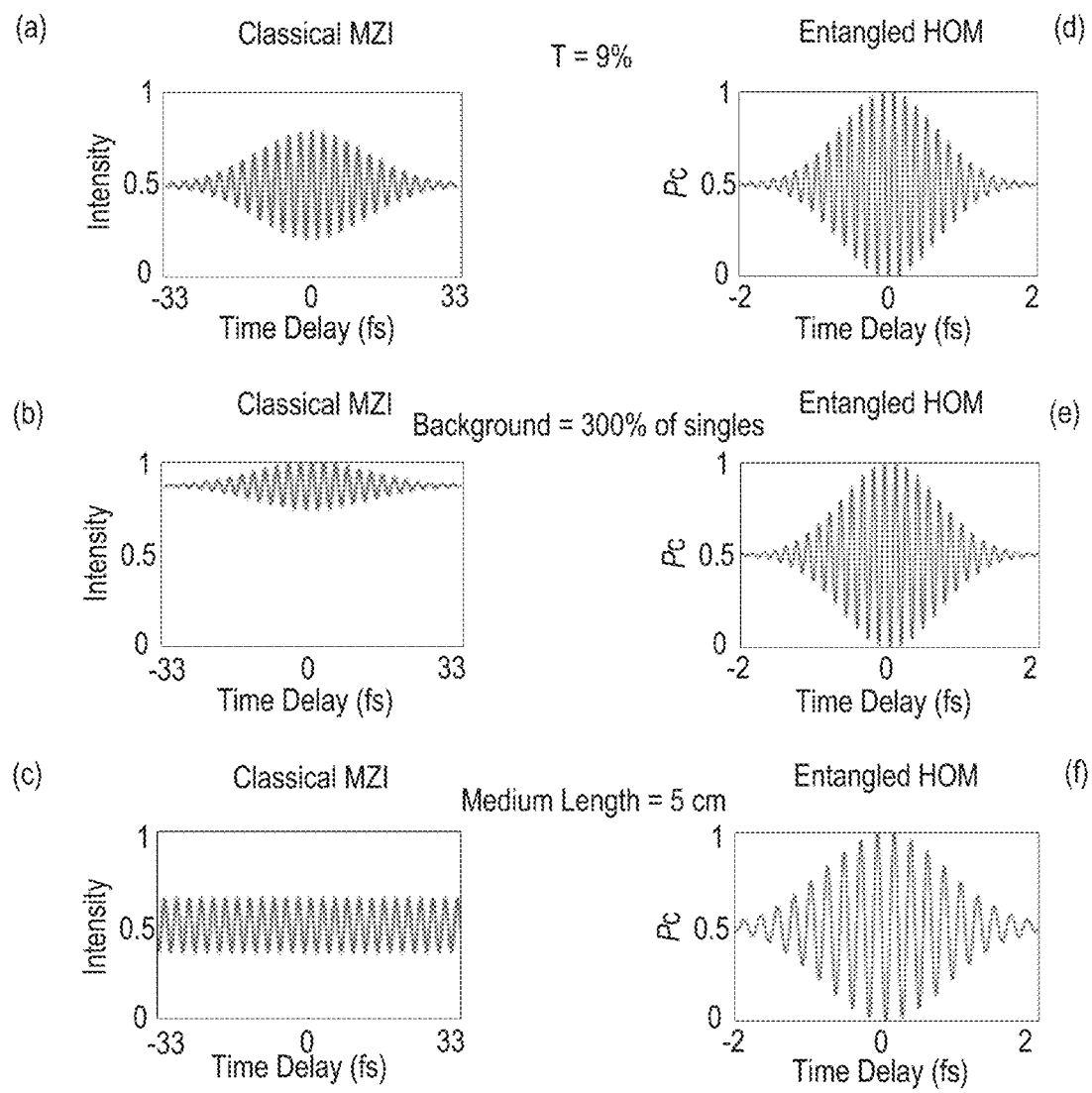
FIG. 5 illustrates properties of outputs generated by different example systems as described herein.

The use of HOM interference as the primary mechanism underlying the measurement schemes described herein also offers a number of benefits, which are illustrated in FIG. 5. These benefits include: (a) dispersion resistance, facilitating high-resolution probing of dispersive materials, (b) noise resilience, enabling measurements in presence of background (noise) photons, and (c) robustness against loss, permitting characterization of lossy materials with great precision.

These advantages can enable novel sensing schemes in regimes beyond the capabilities of state-of-the-art classical interferometers. Possible applications utilizing these new capabilities to advance current technology include, but are not limited to: (1) stealth and security: making unobstructive measurements via single photons and using entanglement to protect against spoofing attacks, (2) differential ranging: conducting short- or long-distance differential ranging in lossy dispersive environments with low photon fluxes, (3) precision topography: probing the topography of highly dispersive or lossy thin films, and (4) medical imaging: performing non-invasive, high-resolution imaging of delicate tissues via quantum optical coherence tomography.

In an embodiment, the system includes an entanglement source for generating highly non-degenerate entangled photons via spontaneous parametric down-conversion (SPDC) (e.g., "source" in FIG. 3. The entanglement sources may be capable of generating high-fidelity polarization-entangled photon pairs at 810 nm ($\omega=2\pi*370$ THz) and 1550 nm ($\omega=2\pi*193.4$ THz).

Example highly non-degenerate polarization-entangled sources that can be used include, but are not limited to: 1) one based on a bulk SPDC crystal in a Sagnac interferometer, 2) one based on a pair of SPDC crystals whose outputs are coherently combined using birefringent beam displacers, and 3) one that employs a custom periodically-poled waveguide in a nonlinear material to directly prepare photons in the non-degenerate polarization entangled state.

Figure 9:
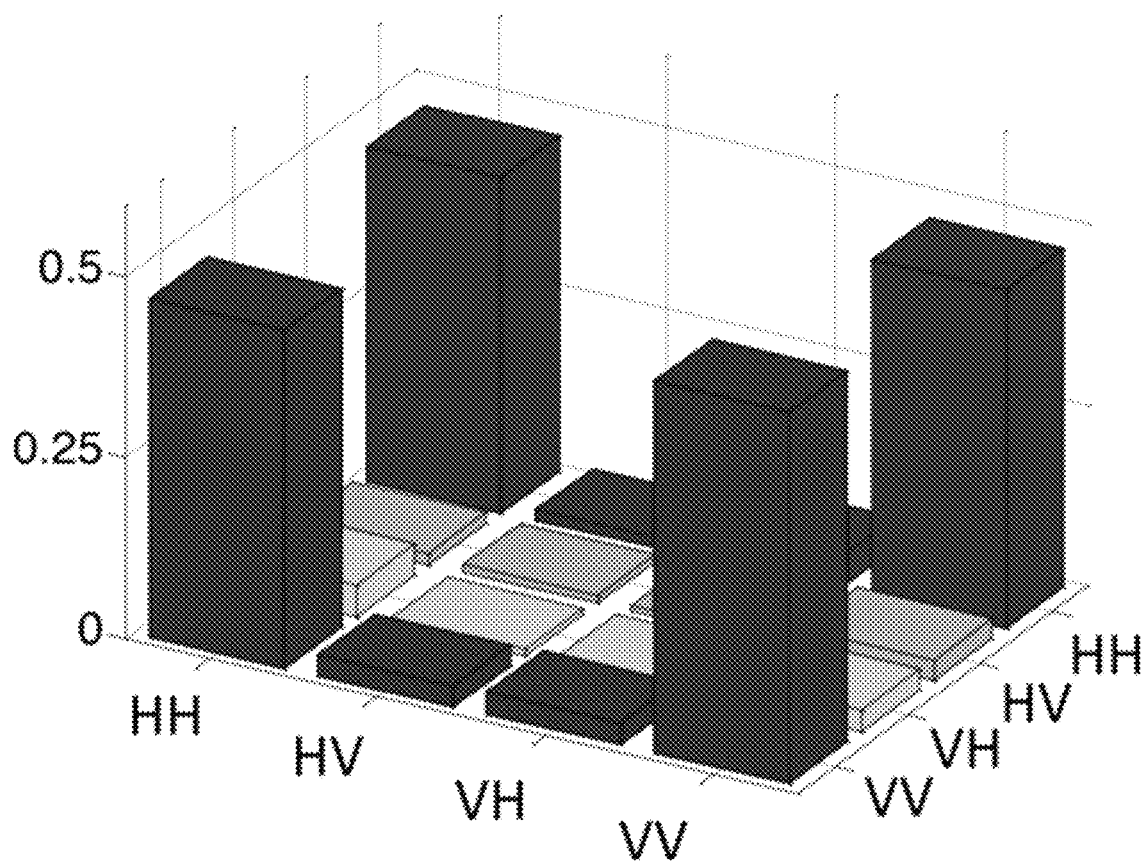
FIG. 9 illustrates experimentally measured outputs generated by an example system as described herein.

Embodiments of such sources were used to generate polarization-entangled states with >98% fidelity (see FIG. 9). Furthermore, some of the sources are quite bright, capable of generating 1 million pairs per second, per milliwatt of pumping power. Practically, this enables the generation of more than 100 million pairs per second, which can allow for high (<attosecond) resolution in short (<1 ms) timescales. The ability to make rapid measurements can improve the practicality of the systems and methods describe herein, increasing attainable sensitivity and reducing issues pertaining to environmental stability.

An embodiment of the present disclosure may further include a precise capacitively monitored piezoelectrically actuated translation stage, e.g., with 0.1-nm or better resolution.

In some embodiments, nano-fabricated dielectric elements and metal films can be created and used to assist with characterizing the ability of the high-resolution interferometer to probe materials on the nanometer scale and/or to calibrate the relationship of the coincidence rate detected by the interferometer with changes in relative path length.

In some embodiments, the detectors include superconducting nanowire single-photon detectors (SNSPDs) that may be optimized for the 810 and 1550 nm wavelengths (or for some other pair of wavelengths represented by the highly degenerate frequency-entangled photon pairs), along with infrastructure required for operation (e.g., cryostat, readout electronics, etc.). The high efficiency and low noise characteristics of these detectors at the working wavelengths of the interferometer allow the systems described herein to perform high resolution (<attosecond) measurements in short (<1 ms) timescales. Such an ability to make rapid measurements provides increased attainable sensitivity and reduces issues pertaining to environmental stability.

As noted above, SNSPDs or some other variety of single-photon-sensitive detectors can be used to detect coincidences between the time of arrival of photons at the two different frequencies represented by the frequency-entangled photon pairs at both outputs of the interferometer's beamsplitter. This can include, as depicted in FIG. 3, separating the received photon pairs by wavelength after being split by the beamsplitter (or, in some embodiments, prior to being split by two different beamsplitters) and then detecting whether photons are received coincidently between pairs of the detectors. Coincidence detection can include operating the detectors to determine the timing of detection of individual photons and then determining whether the timing of detection of photons by any pair of the detectors was sufficiently close to constitute a 'coincidence.' Additionally or alternatively, the detectors could be operated according to a common sampling timing, and detection of at least one photon each by a pair of detectors during the same sample period could constitute a coincidence.

One benefit of using four detectors to detect the arrival of photons at each of the different entangled wavelengths represented within the photon pairs at each of the outputs of the beamsplitter is that single photons or other noise events can be quickly, cheaply, and unambiguously rejected, improving the noise characteristics of the system relative to, e.g., a system that includes only one photodetector for each output of the beamsplitter. However, the systems and methods described herein could be adapted to such a circumstance, with statistical techniques used to infer the coincidence rate based on the outputs of the two photodetectors (with a corresponding reduction in the resolution of the measurement per generated photon pair, related to a reduction in per-pair information gained from photon-bunching effects). In yet another example, a photon-counting detector could be used to detect photons received from each output of the beamsplitter, and the photon counts could be used to infer the coincidence rate.

Further, note that the distance to a target could be determined, based on coincidence rates detected as described herein, via a variety of methods. In some examples, a distance (or thickness of a sample, or other target measurement) could be determined by using a piezo element or other actuator to 'scan' the relative path length of one leg of an interferometer (e.g., a reference leg, a sample leg) across a range of relative lengths (either once or multiple times) in order to determine the location of one or more 'dips,' fringes, or other features in the coincidence rate as a function of the adjusted relative path length, thereby determining an absolute or relative distance to the target (scaled by the index of refraction). Additionally or alternatively, such an actuator could be operated to set the relative path lengths such that the detected coincidence rate is at a specified location along the edge of a fringe or dip in the coincidence rate as a function of the adjusted relative path length; changes in the relative path length could then be determined based on changes in the detected coincidence rate without adjusting the piezo or other path adjustment actuator, e.g., based on a known relationship between changes in the detected coincidence rate and the relative path length. Such a relationship could be determined empirically for a particular interferometer by, e.g., operating a nanofabricated calibration target or other element to insert known changes of path length into one of the legs of the interferometer and then detecting the resulting change in the detected coincidence rate.

Some embodiments of the present disclosure include the generation of highly non-degenerate polarization-entangled photons via spontaneous parametric down-conversion (SPDC). Such a source can be capable of generating high fidelity polarization-entangled photon pairs with a frequency difference of >150 THz, e.g., >177 THz. Interferometer and other optical components are configured to simultaneously support both of the highly frequency-separated light wavelengths (e.g., 810 nm and 1550 nm). The photons are then sent through a polarizing beam splitter and half-wave plate that converts the polarization entanglement into frequency entanglement. This results in a frequency-entangled state with an extremely large detuning of 177 THz, or 33 times greater than previous work in broadband photon pairs. The path length can be changed in one arm using a nanofabricated substrate to explicitly quantify resistance to loss. The photons can then be combined onto a beam splitter and the resulting Hong-Ou-Mandel fringes observed. With the increased detuning offered by the embodiments described herein (e.g., the generation of >150 THz detuned frequency-entangled photon pairs by, e.g., generating and converting >150 THz non-degenerate polarization-entangled photon pairs), a time resolution of 10 attoseconds (or less) can be achieved, with attosecond resolution measurements obtainable in <1 ms based on <$10^4$ detected photon pairs. This represents an improvement of 2 orders of magnitude over prior work using frequency-entangled HOM.

Note that, while systems and methods described herein have included the use of frequency-entangled photon pairs that contain contents at a single pair of wavelengths (e.g., first and second wavelengths at, e.g., 810 nm and 1550 nm), it is possible to extend the systems and methods described herein to employ frequency-entangled photon pairs that contain contents at multiple different pairs of wavelengths. Such multiple different populations of photon pairs could be generated by respective different photon sources (e.g., different spontaneous parametric downconversion light sources configured to generate high-fidelity polarization-entangled photon pairs containing respective different pairs of wavelengths of light) that are then mixed together (e.g., by fiber couplings, beamsplitters, dichroics, etc.) to separate the photon pairs into reference and sample legs of an interferometer so as to be used to measures timings or distances as described herein. The properties of the fringes (e.g., envelope width, fringe width) developed within such an interferometer by such frequency-entangled photon pairs, and thus the resolution of such an interferometer, are a function of the particular detuning between the pairs of wavelengths represented by such photon pairs. Thus, the use of multiple different populations of photon pairs, representing respective multiple different pairs of wavelengths of light, could lead to respective different fringe patterns, e.g., with multiple different fringe widths with respect to relative path differences. Thus, the use of multiple sets of frequency-entangled photons pairs containing respective different pairs of wavelengths of light could allow for increased-resolution sensing, absolute distance sensing, or some other improvements with respect to time or distance measurement.

Frequency-entangled HOMi allows for the characterization of lossy materials with great precision, measurements in the presence of background noise, higher resolution with fewer photons, and high-resolution probing of dispersive materials. The large detuning achieved by the disclosed technology results in the ability for sensing on the attosecond (nanometer) scale via HOM interference without the need for ultra-broadband sources. Applications could include conducting short- or long-distance differential ranging, making unobtrusive stealth measurements, conducting precision topography, and performing non-invasive, high-resolution imaging of delicate tissues related to medical imaging.

These as well as other aspects, advantages, and alternatives will become apparent to those of ordinary skill in the art by reading the detailed description with reference where appropriate to the accompanying drawings. Further, it should be understood that the description provided in this section and elsewhere in this document is intended to illustrate the claimed subject matter by way of example and not by way of limitation.

II. EXAMPLE APPLICATIONS AND BENEFITS

Precision Measurements

The need for precise, non-destructive measurements is of increasing importance in the engineering of nanofabricated devices as well as the study of biological materials. However, precise optical measurements of many materials can be challenging with current methods. These measurements often rely on classical interference to achieve nanometer-scale resolution. This limits the number of applicable systems, as classical interference has reduced precision when looking at lossy and dispersive materials such as biological tissue and glass. Further, the optical powers required to utilize classical interference can cause heating of the sample and other measurement devices, such as in the case of atomic force microscopy (AFM).

"Quantum optical coherence tomography" schemes involve performing two-photon quantum interference using pairs of entangled photons; such schemes demonstrate robustness against dispersion, loss, and background noise. However, in these systems the measurement resolution is limited by the bandwidth of the photons used. While this has been partially resolved with the use of ultra-broadband photons, use of such photons make these systems very challenging to calibrate. Certain embodiments of the present disclosure do not use ultra-broadband photons; instead, far higher resolutions are achieved via the use of highly non-degenerate but narrowband photons. This technique results in far better sensitivity than achievable by using ultra-broadband photons while also making the system far easier to calibrate by virtue of the narrowband nature of the photons (e.g., narrowband photons at two discrete different, highly separate wavelengths).

Certain embodiments of the present disclosure perform measurements at the single-photon level, and so their performance may be related to the ability to generate entangled photon pairs at a high rate. Modern sources can generate a relatively large number of entangled photons in a short amount of time, allowing high resolution measurements to be obtained using the embodiments described herein in fractions of a second. Thus, probing is not limited to static samples; measurements can also be performed on dynamic systems, such as analyzing blood flow through blood vessels by measuring minute displacements of the vessel wall due to vibrations induced by flowing fluids.

Medical Applications

The opaque and materially complex nature of biological tissues has made probing them by classical interferometric techniques challenging due to the presence of optically lossy and dispersive media, as well as their potential sensitivity to powerful light sources. As the measurement techniques described herein rely on two-photon quantum interference, they are robust against dispersion, loss, and background noise. Thus, high-resolution measurements are achievable at the single-photon level, making the techniques described herein suitable for probing light-sensitive structures such as sensory organs associated with the visual system.

Such probing can be topographical. For instance, a system as described herein could be used to scan the retinal surface of a human eye to determine its topology, which may aid diagnoses of retinal disorders. Furthermore, as biological tissues are typically comprised of multiple layers of materials, with each layer providing an interface from which probing photons emitted from a system as described herein can reflect, incorporating time-of-flight analysis of the data produced using such a system can allow for high-resolution 'depth' reconstructions similar in principle to those achieved by optical coherence tomography (OCT), but with potential advantages due to the resilience to loss and noise.

As photons travel easily across long distances in free space, both close- and far-range measurements are in principle feasible. That is, embodiments of a system as described herein could be used to study a patient on an operating room table or to measure the blood circulation of a wild animal situated at a distance from the observer, assuming sufficient photons could be reflected back from the target.

Material Characterization

The measurement of nanostructures on fabricated materials is an application for which embodiments of a system as described herein can offer improvements over current measurement techniques. Each are considered in turn.

3D Optical Profilometry: Optical profilometers come in two standard varieties: interferometric and confocal. Interferometric profilometers rely on an optical interferometer to map out the surface of materials, utilizing the material itself as one of the reflective surfaces. The detailed structure of the surface creates an interference pattern from which height information can be extrapolated. This method has several limitations. It requires the surface to be at least moderately reflective, otherwise the visibility of the interferometer will be decreased. Also, the laser power itself can cause damage to particularly sensitive objects. Both of these problems can be overcome by a system as described herein due to its single-photon nature and its resilience to loss.

Confocal profilometers, or laser scanning confocal microscopes (LSCM), operate on similar principles to fluorescence microscopes. The sample is illuminated, and the fluorescent light is collected and observed. Rather than illuminating the whole object at once, however, a LSCM focuses a laser upon a single point on the material, and pinholes ensure that only nearby fluorescence is detected. The laser can then be scanned over the entire surface to build an image. While this method allows for nanometer-scale resolutions, making optical measurements using classical light may require a bright light source. As certain samples may be damaged when illuminated with bright light, this method therefore may not be suitable for all types of samples. In contrast, embodiments of a system as described herein make measurements using light at the single-photon level, thereby offering a significantly reduced risk of sample damage due to light exposure.

Atomic Force Microscopy (AFM): AFM combines an interferometer with an atomic-scale cantilever. Light is reflected off the cantilever, forming one of the arms of the interferometer. When the cantilever is in contact with a surface, it bends, changing the phase of the interferometer. This phase information can then be extracted to map out the surface of the material in question. The resolution is high—including sub nanometer—but is limited by the method's reliance on an optical interferometer. First, incident photons cause heating of the sample and cantilever, so the power used must be low. This restricts one of the primary advantages of classical interferometry, that the sample rate is high. Second, the size of the cantilever itself presents an issue: it must be atomic scale to detect small features, but this size prevents it from reflecting much light. This leads to an imbalanced loss in the system, something which reduces the visibility—and therefore resolution—of a classical interferometer. As embodiments of a system as described herein operate on the single-photon level and are immune to this loss imbalance, they could be advantageously applied to AFM applications.

Monitoring and Surveillance

Certain embodiments of the present disclosure are capable of performing monitoring and surveillance tasks via two distinct physical mechanisms: Differential time-of-flight measurements and (possibly time-dependent) surface displacements (e.g., vibrations).

Time of Flight Measurements: Light Detection and Ranging (LIDAR) uses time-of-flight measurements to measure how far away an object is from the light source. Light is reflected off the object and then collected into an optical detector. The distance is calculated based on the time it takes for the light to arrive at the detector relative to the time of emission of the probe light. LIDAR is typically used for scanning large areas with centimeter-scale resolution from distances of hundreds of meters; recently faster detectors have enabled millimeter-scale resolution. Embodiments of the present disclosure can improve upon LIDAR technology by offering much higher resolution at long distances (single photons can be sent through the atmosphere over long distances (e.g., 100 km) while still establishing a reliable quantum information channel), assuming sufficiently many photons are returned from the target. Therefore, given the ability of the embodiments described herein to achieve nanometer (or better) resolution, such embodiments could provide significantly improved measurement of distant objects, allowing for measurement of extreme detail (e.g., vibrations) at a distance.

Surface Displacements: There exist many phenomena that involve the displacement(s) of a physical surface (e.g., vibrations). When such surfaces are a part of an optical path (e.g., as reflectors of incident light), the displacement of these surfaces changes the length of the overall optical path. Since the systems described herein are extremely sensitive to changes in relative optical path lengths, they are well suited to perform measurements of surface displacements, both in local and non-local settings. Embodiments of the present disclosure can perform local measurements of many types of vibrations. In this capacity, the systems and methods described herein can provide significantly higher measurement resolution than conventional methods. The systems and methods described herein are also able to perform such measurements in a non-local, remote manner by virtue of photons' ability to propagate over long distances (in principle unlimited) at high speed (~300,000 km/s). That is, the sensitivity of a system as described herein to changes in the relative path length is in principle independent of the overall path length (assuming enough photons are returned).

Measurements of such phenomena can have great value as tools for monitoring and surveillance. Applications fall into two categories: "direct" and "indirect". The former involves gathering information from directly observing surface-displacement phenomena. The latter involves deducing information about events that introduce surface displacements as a secondary, indirect effect.

Examples of applications in the "direct" category include, but are not limited to the following:

Detecting seismic events: These events involve vibrations of the Earth. Such events can be either naturally occurring (earthquakes, volcanic activity, large quantities of flowing water) or caused by human activity (mining, rocket launches, underground nuclear weapons testing).

Detecting operating machinery: Certain machinery vibrate when operating. Such vibrations may be caused by moving parts (e.g., internal combustion engine, electric motors) or flowing fluids (e.g., coolant traveling through pipes, exhaust gases exiting rocket engine), among other causes. Hence, the presence (or lack) of vibrations indicates whether a machine is currently operating or not; the amplitude and frequency of the vibrations (obtainable from a Fourier analysis of the data) may yield additional information about the device operation.

Examples of applications in the "indirect" category include, but are not limited to:

Remote microphone: It has been demonstrated that it is possible to extract audio information from analyzing vibrations of surfaces in the vicinity of a sound source, e.g., by using a laser microphone or video footage of said surfaces. Physically, sound exists as vibrations propagating through the air. Therefore, sound waves emanating from a speaking person's mouth may propagate and come into contact with other objects, such as plant leaves. Such contact transfers the vibrational energy from the air to the object, thereby causing the object to also vibrate. Since different sounds vibrate differently, analysis of such indirect vibrations may be able to reveal the original sounds. Systems as described herein can monitor distant environments to measure vibrations local to those environments, allowing one to listen from far away without the sound waves needing to travel to the listener.

Remote seismometry: Modern methods of seismometry and oil exploration rely on a local detector to read vibrations from the Earth. However, due to the ability of a system as described herein to measure vibrations from a distance, remote monitoring of seismic events could be possible while keeping costly equipment at a safe distance. This, combined with remote generation of vibrations (e.g., sound waves), could conceivably allow for the remote detection of important underground features such as oil fields or silos.

Detecting presence of material in an enclosure: Certain materials in certain enclosures, such as pressurized gas in a tank or a fluid in a pipe, exert outward pressure on the container walls. This causes the enclosure walls to bulge outwards by an amount that depends on the enclosure type (this amount is very large for a party balloon being filled with helium, but extremely small for a propane tank being filled by propane gas). Therefore, the displacement of the enclosure wall may be a direct measure of the presence (or lack) of a material inside.

While it is theoretically true that ordinary interferometers are also capable of making such nonlocal vibration measurements, in practice using them to make interferometric measurements over long optical paths introduce significant challenges. By relying on coincident photon pairs, embodiments of the present disclosure allow for measurements in noisy environments where background light would prohibit classical systems from functioning. Any incident background photons must arrive at two independent detectors within a single detector window to act as 'noise' on the measurement—this compares favorably to classical measurements in which every background photon contributes to the measurement's noise.

To suppress background effects even further, narrow bandwidth photons may be employed, allowing for more aggressive filtering strategies. This compares favorably to standard methods of precision QOCT, in which ultra-broadband photons must be employed for maximum sensitivity. This use of narrowband photons has several other distinct advantages: because a photon's coherence time is inversely related to its bandwidth, narrower photons interfere over greater distances. This allows for easier tuning, as the two paths of the interferometer must be matched to within the coherence time. Further, these narrowband photons are more robust against dispersion, allowing a system as described herein to probe a larger variety of materials.

The ability of a system as described herein to perform measurements at the single-photon level lends it an additional key advantage—stealth. Single photons are undetectable by the human eye, and largely undetectable by photon detectors not configured to detect at the photons' particular spatial mode and wavelength. Therefore, a system as described herein can perform vibration measurements in a stealthy manner, which conceivably has many applications.

The stealth measurement capability could be of particular importance in particular applications. For example, it could be desirable to secretly observe the activity of machinery inside an inaccessible area (e.g., needing to know when an engine is turned on, or when a fluid is being transferred through a pipe) to which a clear line-of-sight is available. A system as described herein will be able to measure any vibrations associated with this machinery by establishing an optical path length from the outside location to the machinery surface (e.g., through a glass window) and back. Changes in this path length induced by the vibrating machinery may then be observed at a high resolution without revealing the presence of the observers. Unlike ordinary interferometers, the quality of a measurement generated via the techniques described herein is generally less affected by background noise (e.g., from surrounding light sources) or by the loss and dispersion introduced by propagating through a glass window or other dispersive media along the line-of-sight to the target.

Additionally, since a system as described herein performs measurements using entangled pairs of photons, the "monogamy of entanglement"—a given quantum system can only be maximally (two-party) entangled with a single other quantum—makes it impossible, in the rare chance that the measurement process is detected, for the opponent to secretly capture the incoming photons and falsify the measurement results by returning spoofed photons. This will result in the immediate loss of entanglement, which is detectable by a system as described herein. Therefore, a system as described herein is secure against spoofing attacks, which is another useful feature.

III. EXAMPLE SYSTEMS

Figure 10:
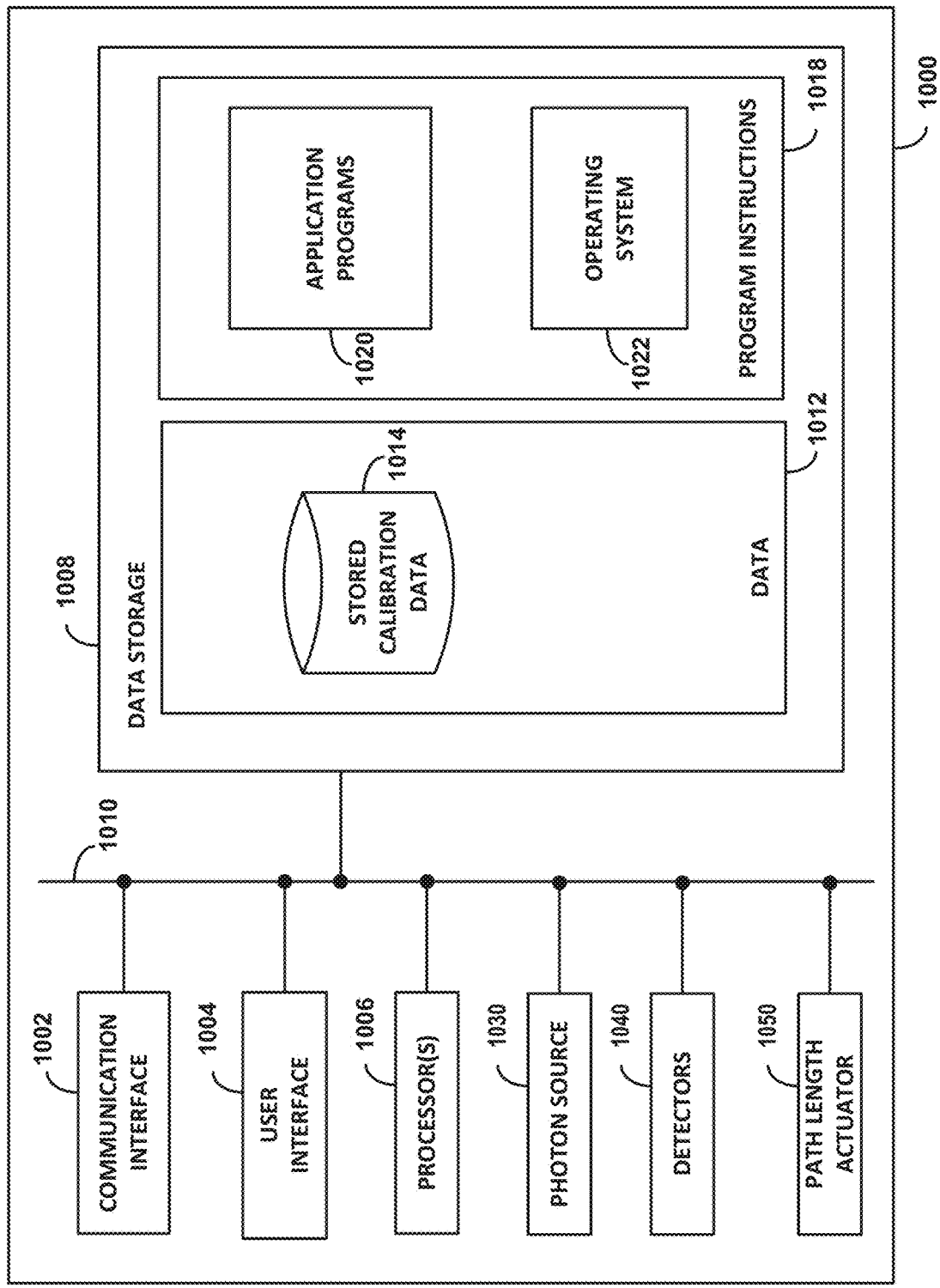
FIG. 10 illustrates aspects of an example system.

FIG. 10 illustrates an example system 1000 that may be used to implement the methods described herein. By way of example and without limitation, system 1000 may be or include a computer (such as a desktop, notebook, tablet, or handheld computer, a server), elements of a cloud computing system, or some other type of device or system. It should be understood that elements of system 1000 may represent a physical instrument and/or computing device such as a server, a particular physical hardware platform on which applications operate in software, or other combinations of hardware and software that are configured to carry out functions as described herein.

As shown in FIG. 10, system 1000 may include a communication interface 1002, a user interface 1004, one or more processor(s) 1006, data storage 1008, a photon source 1030, photodetectors 1040, and a path length actuator 1050, all of which may be communicatively linked together by a system bus, network, or other connection mechanism 1010.

Communication interface 1002 may function to allow system 1000 to communicate, using analog or digital modulation of electric, magnetic, electromagnetic, optical, or other signals, with other devices, access networks, and/or transport networks. Thus, communication interface 1002 may facilitate circuit-switched and/or packet-switched communication, such as plain old telephone service (POTS) communication and/or Internet protocol (IP) or other packetized communication. For instance, communication interface 1002 may include a chipset and antenna arranged for wireless communication with a radio access network or an access point. Also, communication interface 1002 may take the form of or include a wireline interface, such as an Ethernet, Universal Serial Bus (USB), or High-Definition Multimedia Interface (HDMI) port. Communication interface 1002 may also take the form of or include a wireless interface, such as a Wifi, BLUETOOTH®, global positioning system (GPS), or wide-area wireless interface (e.g., 3GPP Long-Term Evolution (LTE), or 3GPP 5G). However, other forms of physical layer interfaces and other types of standard or proprietary communication protocols may be used over communication interface 1002. Furthermore, communication interface 1002 may comprise multiple physical communication interfaces (e.g., a Wifi interface, a BLUETOOTH® interface, and a wide-area wireless interface).

User interface 1004 may function to allow system 1000 to interact with a user, for example to receive input from and/or to provide output to the user. Thus, user interface 1004 may include input components such as a keypad, keyboard, touch-sensitive or presence-sensitive panel, computer mouse, trackball, joystick, microphone, and so on. User interface 1004 may also include one or more output components such as a display screen which, for example, may be combined with a presence-sensitive panel. The display screen may be based on CRT, LCD, and/or LED technologies, or other technologies now known or later developed. User interface 1004 may also be configured to generate audible output(s), via a speaker, speaker jack, audio output port, audio output device, earphones, and/or other similar devices.

Photon source 1030 may include a variety of elements configured to generate frequency-entangled photon pairs that can be emitted to interrogate a target as described elsewhere herein. The photon source 1030 could be configured to generate highly nondegenerate frequency-entangled photon pairs directly. Alternatively, the photon source could generate entangled photon pairs of some other variety that could then be converted into highly nondegenerate frequency-entangled photon pairs. For example, the photon source 1030 could generate highly nondegenerate (e.g., at approximately 810 and 1550 nm) polarization-entangled photon pairs (e.g., using a spontaneous parametric down-conversion light source) that could then be converted into highly nondegenerate frequency-entangled photon pairs (e.g., by using a polarizing beamsplitter and a half wave plate). Such conversion elements may be incorporated into the photon source 1030 or may be part of an optical bench or other optical system of the system 1000. Photon source 1030 may be configured to generate such entangled photon pairs at a high rate, thereby enabling high-resolution measurements in short periods of time (e.g., fractions of a second). The photon source 1030 could be configured to generate frequency-entangled nondegenerate photon pairs (or photon pairs that can be used to generate such frequency-entangled nondegenerate photon pairs) at a plurality of different wavelength pairs in order to facilitate improved measurements (by enabling the detection of path length changes at multiple different wavelengths/wavelength pairs). This could involve the use of multiple different independent photon sources (e.g., spontaneous parametric downconversion light source) configured to generate respective entangled photon pairs are respective wavelengths and according to a synchronized emission timing.

The detectors 1040 could include a variety of different photodetector types configured in a variety of different ways to facilitate coincident photon detection as part of a detection method as described herein. As noted above, four detectors may be employed to facilitate coincidence detection for pairs of frequency-entangled nondegenerate photons; however, it is also possible two use only two detectors to perform such detection in a degraded fashion by using the outputs of such two detectors to infer coincidence detection. The individual detectors may be any variety of highly time-resolved photon detectors with single-photon sensitivity. For example, superconducting nanowire single-photon detectors could be used. Coincidence detection for pairs of individual photodetectors of the detectors 1040 could be accomplished by comparing time-of-detection measurements between the pairs of photodetectors, by operating the pairs of photodetectors according to the same sampling timing, or according to some other method permitting determination of coincident detection of photons by pairs of individual photodetectors of the set of detectors 1040.

The path length actuator 1050 could include a piezoelectric element(s), servomotors, and/or some other component(s) configured to allow for precise adjustment of the path length of one leg of the interferometer of the system 1000. The path length actuator 1050 could be operated by the processor(s) 1050 in order to measure an absolute or relative distance to a target by, e.g., scanning a range of path lengths in order to determine a path length adjustment at which a dip in coincidence detection of entangled photon pairs is located. Additionally or alternatively, the path length actuator 1050 could be set to a particular path length adjustment (e.g., at a path length adjustment along the edge of a dip in coincidence detection) and changes in distance to a target can be determined based on changes in the coincidence detection rate (e.g., using calibration data determined for the system 1000).

The system 1000 could include additional elements to facilitate, e.g., calibration of the system 1000. For example, the system 1000 could include an actuator and nanofabricated test article having one or more known thicknesses that can be inserted, by the actuator, into one of the legs (e.g., a reference leg, a sample leg) of the interferometer of the system 1000. The known thickness(es) of the test article could then be used to calibrate the interferometer of the system 1000 by comparing the detected change in path length of affected leg of the interferometer to the known thickness(es) of the test article.

Processor(s) 1006 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of coincidence detection (e.g., high-frequency comparators or other elements configured to identify coincidental detection of photons between pairs of the detectors 1040 and/or to count the occurrence of such coincidences), calibration of the system (e.g., determining a relationship between a change in coincidence rate output from the detectors 1040 and a change in distance to a surface under interrogation by the system 1000), or other functions as described herein, among other applications or functions. Data storage 1008 may include one or more volatile and/or non-volatile storage components, such as magnetic, optical, flash, or organic storage, and may be integrated in whole or in part with processor(s) 1006. Data storage 1008 may include removable and/or non-removable components.

Processor(s) 1006 may be capable of executing program instructions 1018 (e.g., compiled or non-compiled program logic and/or machine code) stored in data storage 1008 to carry out the various functions described herein. Therefore, data storage 1008 may include a non-transitory computer-readable medium, having stored thereon program instructions that, upon execution by system 1000, cause system 1000 to carry out any of the methods, processes, or functions disclosed in this specification and/or the accompanying drawings. The execution of program instructions 1018 by processor(s) 1006 may result in processor 1006 using data 1012.

By way of example, program instructions 1018 may include an operating system 1022 (e.g., an operating system kernel, device driver(s), and/or other modules) and one or more application programs 1020 (e.g., functions for executing the methods described herein) installed on system 1000. Data 1012 may include stored calibration data 1014 (e.g., information about a dependence of coincidence rate detected using the detectors 1040 on distance to a surface under interrogation for one or more pairs of wavelengths of interrogating frequency-entangled photon pairs).

Application programs 1020 may communicate with operating system 1022 through one or more application programming interfaces (APIs). These APIs may facilitate, for instance, application programs 1020 transmitting or receiving information via communication interface 1002, receiving and/or displaying information on user interface 1004, and so on.

Application programs 1020 may take the form of "apps" that could be downloadable to system 1000 through one or more online application stores or application markets (via, e.g., the communication interface 1002). However, application programs can also be installed on system 1000 in other ways, such as via a web browser or through a physical interface (e.g., a USB port) of the system 1000.

IV. EXAMPLE METHODS

FIG. 1100 depicts an example method 1100. The method 1100 includes operating a photon source to generate a plurality of pairs of photons that are frequency-entangled across first and second wavelengths, wherein an interferometer is coupled to the photon source such that a first photon from a photon pair generated by the photon source is directed along a reference leg of the interferometer and a second photon from the photon pair generated by the photon source is directed along a sample leg of the interferometer such that the first photon and second photon are directed into an input of a beamsplitter of the interferometer (1110). The method 1100 additionally includes operating a first photodetector, a second photodetector, a third photodetector, and a fourth photodetector to detect a first coincidence rate at which the pairs of photons are coincidentally detected by at least one pair of the first, second, third, and fourth photodetectors, wherein the first and second photodetectors are configured to detect photons at the first wavelength, wherein the third and fourth photodetectors are configured to detect photons at the second wavelength, and wherein the first and second photodetectors are configured to receive photons emitted from respective first and second outputs of the beamsplitter (1120). The method 1100 additionally includes, based on the first coincidence rate, determining at least one of a travel time difference between the reference leg and the sample leg or length difference between the reference leg and the sample leg (1130). The method 1100 could include additional steps or features.

It should be understood that arrangements described herein are for purposes of example only. As such, those skilled in the art will appreciate that other arrangements and other elements (e.g., machines, interfaces, operations, orders, and groupings of operations, etc.) can be used instead of or in addition to the illustrated elements or arrangements.

V. CONCLUSION

It should be understood that arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

We claim:

1. A system comprising:
 a photon source configured to generate pairs of photons that are frequency-entangled across first and second wavelengths, wherein the photon source comprises: (i) a constituent source configured to generate pairs of photons that are polarization-entangled, (ii) a polarizing beamsplitter, and (iii) a half wave plate, wherein the polarizing beamsplitter and half wave plate are arranged to receive pairs of photons that are polarization-entangled and that are generated by the constituent source, and to convert the pairs of photons from being polarization-entangled to being frequency-entangled across the first and second wavelengths;
an interferometer coupled to the photon source such that a first photon from a photon pair generated by the photon source is directed along a reference leg of the interferometer and a second photon from the photon pair generated by the photon source is directed along a sample leg of the interferometer such that the first photon and second photon are directed into an input of a beamsplitter of the interferometer;
a first photodetector, a second photodetector, a third photodetector, and a fourth photodetector, wherein the first and second photodetectors are configured to detect photons at the first wavelength, wherein the third and fourth photodetectors are configured to detect photons at the second wavelength, and wherein the first and second photodetectors are configured to receive photons emitted from respective first and second outputs of the beamsplitter; and
a leg actuator, wherein the leg actuator is operable to adjust an effective path length of one of the reference leg or the sample leg of the interferometer.

2. The system of claim 1, wherein the constituent source comprises a spontaneous parametric downconversion light source.

3. The system of claim 1, wherein at least one of the first, second, third, or fourth photodetectors comprises a superconducting nanowire single-photon detector.

4. The system of claim 1, wherein the first wavelength and the second wavelength differ from each other by more than 150 THz.

5. The system of claim 1, wherein the third and fourth photodetectors are configured to receive photons emitted from the respective first and second outputs of the beamsplitter, wherein a first filter directs photons of the first wavelength from the first output of the beamsplitter to the first photodetector and photons of the second wavelength from the first output of the beamsplitter to the third photodetector, and wherein a second filter directs photons of the first wavelength from the second output of the beamsplitter to the second photodetector and photons of the second wavelength from the second output of the beamsplitter to the fourth photodetector.

6. The system of claim 1, wherein the beamsplitter is a first beamsplitter, wherein the interferometer includes a second beamsplitter, wherein a filter directs photons of the first wavelength to the input of the first beamsplitter and photons of the second wavelength to an input of the second beamsplitter, and wherein the third and fourth photodetectors are configured to receive photons emitted from respective first and second outputs of the second beamsplitter.

7. The system of claim 1, further comprising:
a controller comprising one or more processors, wherein the controller is operably coupled to the photon source and to the first, second, third, and fourth photodetectors, and wherein the controller is configured to perform controller operations comprising:
operating the photon source to generate a plurality of pairs of photons;
operating the first, second, third, and fourth photodetectors to detect a first coincidence rate at which the pairs of photons are coincidentally detected by at least one pair of the first, second, third, and fourth photodetectors; and
based on the first coincidence rate, determining at least one of a travel time difference between the reference leg and the sample leg or length difference between the reference leg and the sample leg.

8. The system of claim 7, wherein the controller operations further comprise:
operating the leg actuator to adjust an effective path length of one of the reference leg or the sample leg of the interferometer across a range of path lengths;
generating a plurality of coincidence rates for a plurality of path lengths within the range of path lengths by, for a given path length of the plurality of path lengths: (i) operating the photon source to generate a plurality of pairs of photons while the leg actuator has adjusted the effective path length to the given path length; (ii) operating the first, second, third, and fourth photodetectors to detect a coincidence rate at which the pairs of photons are coincidentally detected by at least one pair of the first, second, third, and fourth photodetectors while the leg actuator has adjusted the effective path length to the given path length; and
determining a location, with respect to path length, of a feature of at least one of a dip or a fringe that is represented in the plurality of coincidence rates, wherein determining at least one of a travel time difference between the reference leg and the sample leg or length difference between the reference leg and the sample leg based on the first coincidence rate comprises determining the at least one of a travel time difference between the reference leg and the sample leg or length difference between the reference leg and the sample leg based on the location of the feature.

9. The system of claim 7, wherein the controller operations further comprise:
operating the leg actuator to adjust an effective path length of one of the reference leg or the sample leg of the interferometer such that a difference in effective path length between the reference leg and the sample leg corresponds to an edge of at least one of a fringe or a dip in a detected coincidence rate as a function of the difference in effective path length between the reference leg and the sample leg;
operating the photon source to generate an additional plurality of pairs of photons; and
operating the first, second, third, and fourth photodetectors to detect a second coincidence rate at which the additional plurality of pairs of photons are coincidentally detected by at least one pair of the first, second, third, and fourth photodetectors, wherein determining at least one of a travel time difference between the reference leg and the sample leg or length difference between the reference leg and the sample leg based on the first coincidence rate comprises determining a relative change in at least one of a travel time difference between the reference leg and the sample leg or length difference between the reference leg and the sample leg based on a difference between the first coincidence rate and the second coincidence rate.

10. The system of claim 7, wherein determining at least one of a travel time difference between the reference leg and the sample leg or length difference between the reference leg and the sample leg comprises determining a travel time difference with a resolution below 10 attoseconds based on fewer than $10^4$ generated pairs of photons.

11. The system of claim 10, wherein the first wavelength and the second wavelength differ from each other by more than 150 THz.

12. The system of claim 1, wherein the pairs of photons that are frequency-entangled across the first and second wavelengths have bandwidths, within each of the first and second wavelengths, that are less than 2π THz.

13. The system of claim 1, wherein the constituent source comprises at least one of: (i) a bulk crystal of spontaneous parametric downconversion light source material in a Sagnac interferometer, (ii) a pair of crystals of spontaneous parametric downconversion light source material and two or more birefringent beam displacers configured to coherently combine the outputs of the crystals, or (iii) a periodically-poled waveguide in a nonlinear material configured to directly prepare photons in the polarization-entangled state.

14. The system of claim 1, wherein the constituent source is configured to generate pairs of photons that are polarization-entangled with greater than 98% fidelity and to produce more than one million pairs of polarization-entangled photons per milliwatt of pumping power.

15. The system of claim 1, wherein the first wavelength and the second wavelength differ from each other by more than 177 THz.

16. A method comprising:
operating a photon source to generate a plurality of pairs of photons that are frequency-entangled across first and second wavelengths, wherein an interferometer is coupled to the photon source such that a first photon from a photon pair generated by the photon source is directed along a reference leg of the interferometer and a second photon from the photon pair generated by the photon source is directed along a sample leg of the interferometer such that the first photon and second photon are directed into an input of a beamsplitter of the interferometer, wherein operating the photon source to generate the plurality of pairs of photons comprises: (i) operating a constituent source to generate a plurality of pairs of photons that are polarization-entangled, (ii) passing the plurality of pairs of photons that are polarization-entangled through a polarizing beamsplitter and a half wave plate, wherein the polarizing beamsplitter and half wave plate are arranged to receive pairs of photons that are polarization-entangled and that are generated by the constituent source, and to convert the pairs of photons from being polarization-entangled to being frequency-entangled across the first and second wavelengths;
operating a first photodetector, a second photodetector, a third photodetector, and a fourth photodetector to detect a first coincidence rate at which the pairs of photons are coincidentally detected by at least one pair of the first, second, third, and fourth photodetectors, wherein the first and second photodetectors are configured to detect photons at the first wavelength, wherein the third and fourth photodetectors are configured to detect photons at the second wavelength, and wherein the first and second photodetectors are configured to receive photons emitted from respective first and second outputs of the beamsplitter; and
based on the first coincidence rate, determining at least one of a travel time difference between the reference leg and the sample leg or length difference between the reference leg and the sample leg.

17. The method of claim 16, wherein the photon source, beamsplitter, first photodetector, a second photodetector, a third photodetector, and fourth photodetector are part of a detection system, wherein the sample leg of the interferometer includes a portion of a target that is physically remote from the detection system, and wherein the method further comprises:

detecting, based on the determined at least one of a travel time difference between the reference leg and the sample leg or length difference between the reference leg and the sample leg, a vibration of the target.

18. The method of claim 16, wherein determining at least one of a travel time difference between the reference leg and the sample leg or length difference between the reference leg and the sample leg comprises determining a travel time difference with a resolution below 10 attoseconds based on fewer than 104 generated pairs of photons.

19. The method of claim 16, further comprising:
operating a leg actuator to adjust an effective path length of one of the reference leg or the sample leg of the interferometer across a range of path lengths;
generating a plurality of coincidence rates for a plurality of path lengths within the range of path lengths by, for a given path length of the plurality of path lengths: (i) operating the photon source to generate a plurality of pairs of photons while the leg actuator has adjusted the effective path length to the given path length; (ii) operating the first, second, third, and fourth photodetectors to detect a coincidence rate at which the pairs of photons are coincidentally detected by at least one pair of the first, second, third, and fourth photodetectors while the leg actuator has adjusted the effective path length to the given path length; and
determining a location, with respect to path length, of a feature of at least one of a dip or a fringe that is represented in the plurality of coincidence rates, wherein determining at least one of a travel time difference between the reference leg and the sample leg or length difference between the reference leg and the sample leg based on the first coincidence rate comprises determining the at least one of a travel time difference between the reference leg and the sample leg or length difference between the reference leg and the sample leg based on the location of the feature.

20. The method of claim 16, further comprising:
operating a leg actuator to adjust an effective path length of one of the reference leg or the sample leg of the interferometer such that a difference in effective path length between the reference leg and the sample leg corresponds to an edge of at least one of a fringe or a dip in a detected coincidence rate as a function of the difference in effective path length between the reference leg and the sample leg;
operating the photon source to generate an additional plurality of pairs of photons; and
operating the first, second, third, and fourth photodetectors to detect a second coincidence rate at which the additional plurality of pairs of photons are coincidentally detected by at least one pair of the first, second, third, and fourth photodetectors, wherein determining at least one of a travel time difference between the reference leg and the sample leg or length difference between the reference leg and the sample leg based on the first coincidence rate comprises determining a relative change in at least one of a travel time difference between the reference leg and the sample leg or length difference between the reference leg and the sample leg based on a difference between the first coincidence rate and the second coincidence rate.

* * * * *